United States Patent
Cadotte, Jr. et al.

(10) Patent No.: US 11,986,817 B2
(45) Date of Patent: May 21, 2024

(54) STRETCH BLOW MOLDED PIPETTE, AND SYSTEM AND METHOD FOR FORMING SAME

(71) Applicant: CORNING INCORPORATED, Corning, NY (US)

(72) Inventors: John Claude Cadotte, Jr., Waterboro, ME (US); Michael Kurt Schaefer, Gorham, ME (US); James Mark Seymour, Portland, ME (US)

(73) Assignee: CORNING INCORPORATED, Corning, NY (US)

(*) Notice: Subject to any disclaimer, the term of this patent is extended or adjusted under 35 U.S.C. 154(b) by 489 days.

(21) Appl. No.: 16/767,324

(22) PCT Filed: Nov. 28, 2018

(86) PCT No.: PCT/US2018/062904
§ 371 (c)(1),
(2) Date: May 27, 2020

(87) PCT Pub. No.: WO2019/108690
PCT Pub. Date: Jun. 6, 2019

(65) Prior Publication Data
US 2021/0001325 A1    Jan. 7, 2021

Related U.S. Application Data

(60) Provisional application No. 62/592,928, filed on Nov. 30, 2017.

(51) Int. Cl.
*B01L 3/02* (2006.01)
*B29C 49/02* (2006.01)
*B29C 49/06* (2006.01)

(52) U.S. Cl.
CPC .............. *B01L 3/021* (2013.01); *B29C 49/06* (2013.01); *B01L 2200/12* (2013.01); *B01L 2300/028* (2013.01); *B01L 2300/0858* (2013.01)

(58) Field of Classification Search
None
See application file for complete search history.

(56) References Cited

U.S. PATENT DOCUMENTS 3,084,592 A * 4/1963 Scott ....................... B01L 3/021
                                                                    73/61.41
RE31,555 E    4/1984 Garren
(Continued)

FOREIGN PATENT DOCUMENTS

| CN | 2083205 U | 8/1991 |
| CN | 1143562 A | 2/1997 |

(Continued)

OTHER PUBLICATIONS

International Search Report and Written Opinion of the International Searching Authority; PCT/US2018/062904; dated Mar. 6, 2019; 11 Pages; European Patent Office.

(Continued)

*Primary Examiner* — Matthew D Krcha
*Assistant Examiner* — Brittany I Fisher
(74) *Attorney, Agent, or Firm* — Chandra J. Duncan

(57) ABSTRACT

A stretch blow molding method may include fabricating a preform (e.g., by molding, optionally while a core pin rotates within a mold cavity), heating the preform to a softening temperature, stretching and thereby elongating at least a portion of the heated preform, blowing the elongated preform with pressurized fluid within a mold cavity, and cooling the resulting pipette. A system for fabricating a stretch blow molded pipette includes a first mold defining a (Continued)

mold cavity for producing a preform. A stretch rod drive unit is configured to move a stretch rod within an interior of the preform to form an elongated preform, and a second mold defines blow molding cavity and a molding surface to contain expansion of the elongated perform when subjected to blowing by supplying pressurized fluid to an interior thereof.

17 Claims, 12 Drawing Sheets

(56) References Cited

U.S. PATENT DOCUMENTS

| | | | |
|---|---|---|---|
| 5,125,278 A | | 6/1992 | Foldenauer |
| 2009/0019955 A1* | | 1/2009 | Mao ................. B01L 3/021 |
| | | | 156/60 |
| 2009/0124966 A1 | | 5/2009 | Oyama |
| 2013/0104324 A1 | | 5/2013 | Anderson et al. |
| 2014/0260697 A1* | | 9/2014 | Staton ................. B01L 3/021 |
| | | | 73/864.01 |
| 2016/0280449 A1* | | 9/2016 | Mekata ............. B65D 83/384 |
| 2016/0318014 A1* | | 11/2016 | Tubbs ................. B01L 3/0275 |
| 2018/0264460 A1* | | 9/2018 | Cadotte, Jr. ............. B01L 3/021 |
| 2018/0280966 A1* | | 10/2018 | Cadotte, Jr. ............. B29C 49/54 |

FOREIGN PATENT DOCUMENTS

| | | |
|---|---|---|
| CN | 102847566 A | 1/2013 |
| CN | 105813781 A | 7/2016 |
| JP | 51-135593 A | 11/1976 |
| JP | 63-007927 A | 1/1988 |
| JP | 2006-168355 A | 6/2006 |
| JP | 2008-284376 A | 11/2008 |
| JP | 2011-079243 A | 4/2011 |
| WO | 2017/091540 A1 | 6/2017 |

OTHER PUBLICATIONS

Chinese Patent Application No. 201880077867.3, Office Action dated Jun. 16, 2021, 12 pages (5 pages of English Translation and 7 pages of Original Document), Chinese Patent Office.
Japanese Patent Application No. 2020-529352, Notice of Reasons for Refusal dated Nov. 16, 2022, 6 pages (3 pages of English Translation and 3 pages of Original Document), Japanese Patent Office.

* cited by examiner

| SIZE | PREFORM OD (in.) | PREFORM ID (in) | PREFORM LENGTH (in) | HOOP RATIO | AXIAL RATIO | BLOW UP RATIO |
|---|---|---|---|---|---|---|
| 5ml | | | | | | |
| 10ml | 0.250 | .060 - .140 | 9.887 - 13.560 | 1.5 | 1 - 1.37 | 1.5 - 2.06 |
| 25ml | 0.377 | .060 - .270 | 6.789 - 13.560 | 1.5 | 1 - 2.00 | 1.5 - 3.00 |
| 50ml | 0.470 | .060 - .338 | 6.634 - 13.560 | 1.5 | 1 - 2.04 | 1.5 - 3.07 |
| 100ml | 0.640 | .060 - .512 | 4.920 - 13.560 | 1.5 | 1 - 2.76 | 1.5 - 4.13 |

*FIG. 6*

| SIZE | PREFORM OD (in.) | PREFORM ID (in) | PREFORM LENGTH (in) | HOOP RATIO | AXIAL RATIO | BLOW UP RATIO |
|---|---|---|---|---|---|---|
| 5ml | 0.183 | .060 - .115 | 8.540 - 13.560 | 1.5 | 1 - 1.59 | 1.5 - 2.38 |
| 10ml | 0.229 | .060 - .179 | 5.635 - 13.560 | 1.5 | 1 - 2.41 | 1.5 - 3.61 |
| 25ml | 0.355 | .060 - .304 | 3.782 - 13.560 | 1.5 | 1 - 3.59 | 1.5 - 5.38 |
| 50ml | 0.443 | .060 - .381 | 3.628 - 13.560 | 1.5 | 1 - 3.74 | 1.5 - 5.61 |
| 100ml | 0.600 | .060 - .552 | 2.622 - 13.560 | 1.5 | 1 - 5.17 | 1.5 - 7.76 |

*FIG. 7*

| SIZE | PREFORM OD (in.) | PREFORM ID (in) | PREFORM LENGTH (in) | HOOP RATIO | AXIAL RATIO | BLOW UP RATIO |
|---|---|---|---|---|---|---|
| 5ml | .225 - .315 | .060 - .228 | 9.777 - 13.560 | 1.02 - 1.24 | 1 - 1.39 | 1.02 - 1.71 |
| 10ml | .290 - .370 | .060 - .306 | 7.312 - 13.560 | 1.01 - 1.29 | 1 - 1.85 | 1.01 - 2.40 |
| 25ml | .415 - .560 | .060 - .494 | 5.564 - 13.560 | 1.01 - 1.36 | 1 - 2.44 | 1.01 - 3.32 |
| 50ml | .515 - .700 | .060 - .619 | 5.526 - 13.560 | 1.01 - 1.37 | 1 - 2.45 | 1.01 - 3.36 |
| 100ml | .685 - .955 | .060 - .875 | 4.292 - 13.560 | 1.01 - 1.40 | 1 - 3.16 | 1.01 - 4.43 |

*FIG. 8*

| SIZE | PREFORM OD (in.) | PREFORM ID (in) | PREFORM LENGTH (in) | HOOP RATIO | AXIAL RATIO | BLOW UP RATIO |
|---|---|---|---|---|---|---|
| 5ml | .215 - .270 | .060 - .229 | 6.569 - 13.560 | 1.02 - 1.28 | 1 - 2.06 | 1.02 - 2.64 |
| 10ml | .259 - .339 | .060 - .307 | 4.480 - 13.560 | 1.01 - 1.33 | 1 - 3.03 | 1.01 - 4.02 |
| 25ml | .383 - .528 | .060 - .495 | 3.230 - 13.560 | 1.01 - 1.39 | 1 - 4.20 | 1.01 - 5.84 |
| 50ml | .475 - .660 | .060 - .620 | 3.160 - 13.560 | 1.01 - 1.40 | 1 - 4.29 | 1.01 - 6.01 |
| 100ml | .645 - .915 | .060 - .875 | 2.371 - 13.560 | 1.01 - 1.43 | 1 - 5.72 | 1.01 - 8.16 |

FIG. 9

STRETCH BLOW MOLDED PIPETTE, AND SYSTEM AND METHOD FOR FORMING SAME

CROSS REFERENCE TO RELATED APPLICATIONS

This is a national stage application under 35 U.S.C. § 371 of International Application No. PCT/US2018/062904, filed on Nov. 28, 2018, which claims the benefit of priority under 35 U.S.C § 120 of U.S. Provisional Application Ser. No. 62/592,928 filed on Nov. 30, 2017 the contents of which are relied upon and incorporated herein by reference in their entirety.

FIELD

The present disclosure relates generally to unitary measuring pipettes, as well as systems and methods for forming the same by, for example, stretch blow molding.

BACKGROUND

Pipettes are well-known tubular devices that usually have openings at both ends, and are designed to dispense measured quantities of liquids. Pipettes have had widespread usage in a number of industries where accurate measurement and delivery of fluids are required, particularly the medical and laboratory testing and analysis fields. Measuring pipettes typically embody straight glass or plastic tubes with one tapered end, and are calibrated into small divisions so that various amounts of liquid can be measured with the same pipette. Measuring pipettes include Mohr pipettes (with graduation marks that end before tapering begins proximate to the tip) and serological pipettes (with graduation marks that continue to a tapering region proximate to the tip), which both include an open tip and an open mouthpiece Multiple different methods exist for fabricating pipettes, including (i) welding premade mouthpiece and tip components to a hollow tube, (ii) reheating a thick tube followed by drawing the tube downward in open air and trimming the pipette at one or both ends to form a tip and a mouthpiece, and (iii) molding with application of a pressure differential, including vacuum forming and blow molding. Each of these methods entails tradeoffs with respect to cost, quality, performance, and/or processing steps, as detailed below.

Welding premade mouthpiece and tip components to a hollow tube according to method (i) outlined above results in formation of weld seams that may create undesirable residue or particulate in the resulting pipette, and may also create bumps or ridges that may accumulate fluid and contaminants inside a pipette. FIG. 1A is a schematic side cross-sectional view of a welded pipette 10 including a tubular body region 14 arranged between a mouthpiece region 12 and a tip region 16, with a hollow interior 18. Weld joints 13, 15 are provided between respective pairs of the mouthpiece, tubular body, and tip regions 12, 14, 16, and may be produced by ultrasonic welding. The tip region 16 is tapered in width between the adjacent weld joint 15 and a tip opening 17. Optionally, the mouthpiece region 12 includes inner and outer diameter dimensions that are smaller than corresponding dimensions of the tubular body region 14, with the mouthpiece region 12 further including a filter 19 positioned between the adjacent weld joint 13 and a mouthpiece opening 11. As shown, wall thicknesses of the mouthpiece, tubular body, and tip regions 12, 14, 16 may be substantially the same. A typical lower limit of wall thickness for welded pipettes is about 0.6 mm, to enable the weld joints 13, 15 to be fabricated between the mouthpiece, tubular body, and tip regions 12, 14, 16.

FIG. 1B is a flowchart outlining steps of a method 20 for fabricating a welded pipette according to FIG. 1A. A first step 21 includes extruding, cooling, and cutting tubes to be used to form a tubular body. A second step 22 includes handling (e.g., transporting and storing) the work-in-process ("WIP") tubes. A third step 23 includes facing the WIP tubes in preparation for welding. A fourth step 24 includes molding pipette mouthpieces suitable for mating with tubes fabricated in the first step 21. A fifth step 25 includes handling the WIP pipette mouthpieces. A sixth step 26 includes molding pipette tips suitable for mating with tubes fabricated in the first step 21. A seventh step 27 includes handling the WIP pipette tips. Eighth and ninth steps 28, 29 include welding the mouthpieces to one end of the faced tubes, and welding the tips to another end of the faced tubes, respectively. A tenth step 30 includes printing graduations on exterior surfaces of the welded pipettes, and an eleventh step 31 includes inserting filters into mouthpieces of the pipettes. As will be evident upon review of FIG. 1B, the method 20 involves a multitude of processing steps.

Reheating a thick tube followed by drawing down and trimming the pipette at one or both ends to form a tip and a mouthpiece according to method (ii) outlined above entails significant variability in tip and mouthpiece openings, variability in shape transitions between tip, body, and mouthpiece regions, and variations in overall quality. Additionally, since wall thicknesses of the tip and mouthpiece regions are determined by a thickness of the starting tube, the body portion of a resulting pipette may have a wall thickness substantially thicker than necessary, resulting in excessively high material cost. FIG. 2A is a schematic side cross-sectional view of a drawn pipette 40 including a tubular body region 44 arranged between a mouthpiece region 42 and a tip region 46, with a hollow interior 48. Transition regions 43, 45 are provided between respective pairs of the mouthpiece, tubular body, and tip regions 42, 44, 46. The tubular body region 44 has a greater wall thickness than wall thicknesses of the mouthpiece region 42 and the tip region 46. Each transition region 43, 45 includes a variable wall thickness that tapers with increasing distance away from the tubular body region 44. A tip opening 47 is provided at the end of the tip region 46. The mouthpiece region 42 includes a filter 49 positioned between the adjacent transition region 43 and a mouthpiece opening 41. Due to inherent variations in the drawing process, positions and dimensions of the tip region 46, the mouthpiece region 42, and the transition regions 43, 45 may vary from one pipette to another.

FIG. 2B is a flowchart outlining steps of a method 50 for fabricating a drawn pipette according to FIG. 2A. A first step 51 includes extruding, cooling, and cutting thick tubes to be used as body precursors. A second step 52 includes handling (e.g., transporting and storing) the WIP tubes. A third step 53 includes facing the WIP tubes in preparation for heating and drawing steps. A fourth step 54 includes heating the tubes and drawing tip regions. A fifth step 55 includes heating the tubes (if not cooled from the fourth step 54) and drawing mouthpiece regions to form drawn pipettes. A sixth step 56 includes printing graduations on exterior surfaces of the drawn pipettes, and a seventh step 57 includes inserting filters into mouthpieces of the pipettes. As will be evident upon review of FIG. 2B, the method 50 involves numerous processing steps.

Molding with application of a pressure differential according to method (iii) outlined above is capable of producing high quality pipettes free of weld seams, but such method typically results in formation of longitudinally spaced, raised circumferential ring shapes or ribs (i.e., witness features resulting from incursion of softened material into gas escape passages) along an exterior surface of a tubular pipette body, wherein such ring-shaped witness features tend to obscure clarity and readability of graduation lines printed on an exterior of the body. An exemplary pipette 60 that may be produced by molding with application of a pressure differential (according to method (iii) outlined above) is shown in FIG. 3, which is substantially the same as the first figure of International Publication No. WO 2017/091540 A1 entitled "Unitary Serological Pipette and Methods of Producing the Same," and assigned to Corning Incorporated.) Each of a mouth region 62, a body region 64, and a tip region 66 has a curved inner surface 71 that encloses a space, and has a corresponding diameter (namely, a mouth diameter 72, a body diameter 74, and a tip diameter 76). The pipette 60 includes a mouth 73 and a tip 75 that are aligned along a longitudinal axis, with a filter 79 proximate to the mouth 73. Optionally, the pipette 60 may have a mouth-body transition region 63 between the mouth region 62 and the body region 64, as well as a body-tip transition region 65 between the body region 64 and the tip region 66. If the pipette 60 is molded of a continuous material without formation of weld joints (e.g., between the tip region 66, the body region 64, and the mouthpiece region 62), then a substantially smooth inside surface 69 may be provided in the transition regions 63, 65, thereby reducing potential for retention of fluid and/or particulate material. The pipette 60 may also include a series of graduated volumetric markings 77 printed (or imprinted) along an outside surface 68 of (at least) the body region 64 to indicate a volume of liquid contained in a space 78 within the pipette 60. The pipette 60 may be sized to hold a particular volume of liquid (e.g., 1 mL, 2 mL, 5 mL, 10 mL, 25 mL, 50 mL, 100 mL, or another desired volume). Optionally, the diameter 74 of the body region 64 may be greater than either the diameter 72 of the mouth region 62 or the diameter 76 of the tip region 66. The pipette 60 may be manufactured of any suitable materials, such as glass or polymers (e.g., polystyrene, polyethylene, or polypropylene).

Fabrication of the pipette 60 by molding with application of a pressure differential may include supplying a heated parison (e.g., a tube or perform, typically in the shape of a uniform hollow cylinder) into a mold, and creating a differential pressure between an interior and an exterior of the parison to cause the parison to expand and conform to a cavity of the mold. This differential pressure may be created by either supplying pressurized gas (e.g., compressed air at 0.05 to 1.5 MPa) into an interior of the parison, or by generating subatmospheric pressure conditions (also known as vacuum conditions, e.g., at a pressure of 0.01 to 0.09 MPa) along surfaces defining the cavity of the mold. Either case requires the presence of passages in surfaces of the mold to permit the escape of gas between an exterior of the parison and the cavity, to enable expansion of the heated parison. Typically, circumferential channels are formed in curved surfaces of a mold (e.g., in corresponding mold halves) to serve as gas escape passages during a molding operation. Following fabrication of a pipette using mold halves defining registered transverse recessed channel segments along a curved inner surface, a resulting pipette will exhibit longitudinally spaced, raised circumferential rings (i.e., circumferential witness features) along an exterior surface of the tubular pipette body. These circumferential witness features may undesirably interfere with printing of the graduated volumetric markings, and may also distract a user from quickly and accurately reading fluid volumes using the graduated volumetric markings. After sufficient cooling of the expanded material (now embodied in a pipette), the mold is opened, the pipette is ejected, and the mold may receive another heated parison to repeat the process.

Given the foregoing, there is a need for pipettes free of the aforementioned shortcomings, as well as a need for improved systems and methods for producing pipettes.

SUMMARY

Unitary measuring pipettes (e.g., serological pipettes) formed by stretch blow molding, as well as systems and methods for forming unitary measuring pipettes by stretch blow molding, are provided herein. Stretch blow molding includes a stretching of a prefabricated preform, and blowing of a stretched perform within a mold cavity. The preform may be profiled to distribute material in desired locations, resulting in precise body thickness of a pipette. A stretch blow molded pipette includes a tubular body between a tip region and a mouthpiece region. The tip region comprises an average wall thickness that is greater than a wall thickness of the tubular body, and the pipette is devoid of any joint (e.g., a welded joint), such as would be present in a welded pipette between the tubular body and the tip region, and between the tubular body and the mouthpiece region. A stretch blow molded pipette may comprise thermoplastic material, such as biaxially oriented thermoplastic material. A stretch blow molding method may include fabricating a preform (e.g., by molding), heating the preform to a softening temperature, stretching and thereby elongating at least a portion of the heated preform, blowing the elongated preform with pressurized fluid (e.g., gas such as air) within a mold cavity to cause the heated preform to expand into contact with a molding surface and assume a pipette shape, and cooling the blown and elongated preform. In certain embodiments, the stretching may be performed while the preform is outside the mold cavity, followed by closure of mold halves (defining the mold cavity) around the stretched preform. In certain embodiments, the preform may be fabricated by molding while a core pin rotates within a preform mold cavity to orient polymer chains in a radial direction. A system for fabricating a stretch blow molded pipette may include a first mold defining a preform mold cavity, and a rotary drive unit configured to achieve relative rotation between a core pin (positionable within the preform mold cavity) and the first mold during molding of a hollow preform. The system may still further include a stretch rod drive unit that is configured to move a stretch rod within an interior of the preform to form an elongated preform, and a second mold defining a molding surface and a blow molding cavity to contain expansion of the elongated perform when pressurized fluid is supplied to an interior of the elongated preform.

In accordance with certain aspects of the present disclosure, a stretch blow molded pipette comprising a tubular body arranged between a tip region and a mouthpiece region is provided. The tip region comprises an average wall thickness that is greater than a wall thickness of the tubular body, and the stretch blow molded pipette is devoid of any joint (i) between the tubular body and the tip region, and (ii) between the tubular body and the mouthpiece region.

In accordance with additional aspects of the present disclosure, a method for fabricating a pipette comprising a tubular body arranged between a tip region and a mouthpiece region is provided. The method comprises a step of fabricating (molding) a preform comprising a hollow tubular shape. The method comprises an additional step of heating the preform to within a softening temperature of a material of the preform. The method comprises a further step of stretching at least a portion of the heated preform to form an elongated preform. The method comprises a further step of blowing at least a portion of the elongated preform within a mold cavity by applying a pressurized fluid to an interior of the heated preform to cause the heated preform to expand into contact with a molding surface. A further method step comprises cooling the blown and elongated preform.

In accordance with additional aspects of the present disclosure, a system for fabricating a pipette comprising a tubular body arranged between a tip region and a mouthpiece region by a stretch blow molding process is provided. The system comprises a first mold defining a preform mold cavity configured to permit molding of a hollow preform therein. The system further comprises a preform stretching apparatus comprising a stretch rod positionable within an interior of the hollow preform and coupled with a stretch rod drive unit that is configured to move the stretch rod within the interior of the hollow preform to form an elongated preform. The system further comprises a second mold defining a blow molding cavity configured to contain at least a portion of the elongated preform while pressurized fluid is supplied to an interior of the elongated preform to cause the elongated preform to radially expand and contact a molding surface of the second mold.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure.

BRIEF DESCRIPTION OF THE DRAWINGS

The following is a description of the figures in the accompanying drawings. The figures are not necessarily to scale, and certain features and certain views may be shown exaggerated in scale or in schematic, in the interest of clarity or conciseness.

FIG. 6 is a table providing calculated preform outer diameter, preform inner diameter, preform length, hoop ratio, axial ratio, and blow up ratio value ranges useful for producing stretch blow molded pipettes of four different volumes having tubular body wall thickness dimensions consistent with conventional Costar® welded pipettes commercially available from Corning Incorporated (Corning, New York, USA), without using a spinning core pin during a preform fabrication step.

FIG. 7 is a table providing calculated preform outer diameter, preform inner diameter, preform length, hoop ratio, axial ratio, and blow up ratio value ranges useful for producing pipettes of five different volumes, while using 50% less material than conventional Costar® welded pipettes, without using a spinning core pin during a preform fabrication step.

FIG. 8 is a table providing calculated preform outer diameter, preform inner diameter, preform length, hoop ratio, axial ratio, and blow up ratio value ranges useful for producing stretch blow molded pipettes of five different volumes having tubular body wall thickness dimensions consistent with conventional Costar® welded pipettes, including use of a spinning core pin during a preform fabrication step.

FIG. 9 is a table providing calculated preform outer diameter, preform inner diameter, preform length, hoop ratio, axial ratio, and blow up ratio value ranges useful for producing pipettes of five different volumes, while using 50% less material than conventional Costar® welded pipettes, including use of a spinning core pin during a preform fabrication step.

DETAILED DESCRIPTION

Figure 1A:
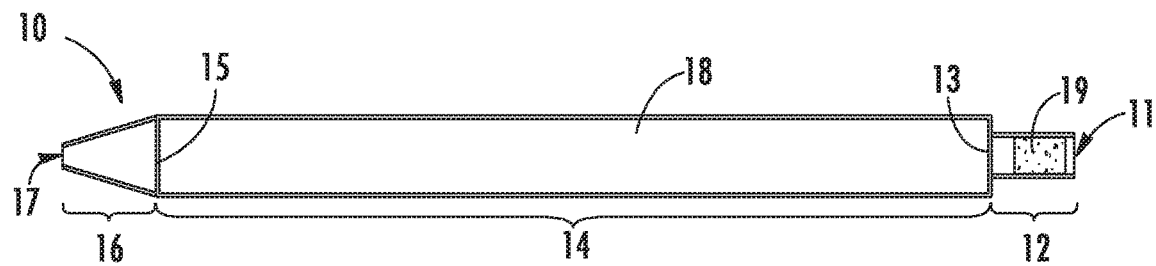
FIG. 1A is a schematic side cross-sectional view illustration of a welded pipette.
Figure 1B:
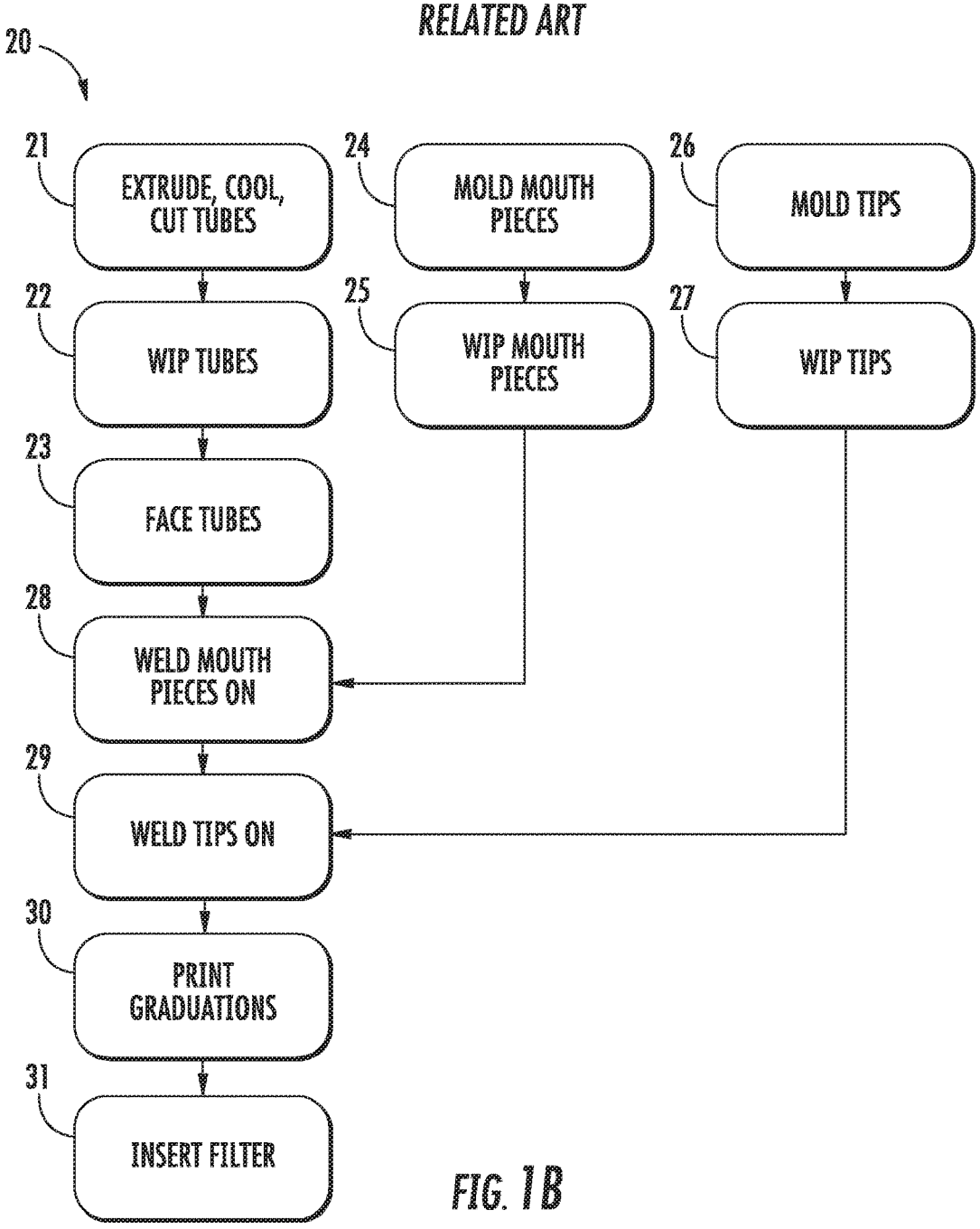
FIG. 1B is a flowchart outlining steps of a method for fabricating a welded pipette according to FIG. 1A.
Figure 2A:
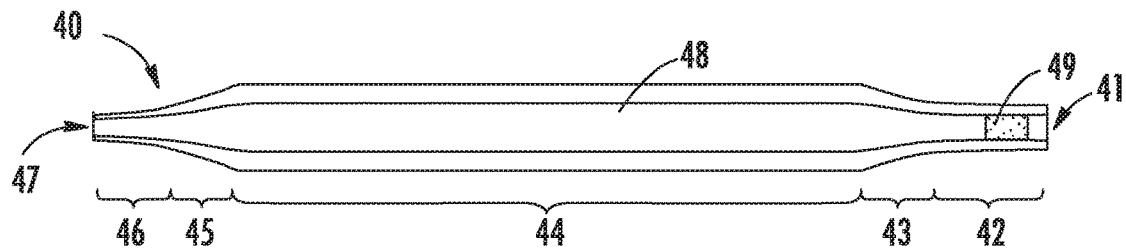
FIG. 2A is a schematic side cross-sectional view illustration of a drawn pipette.
Figure 2B:
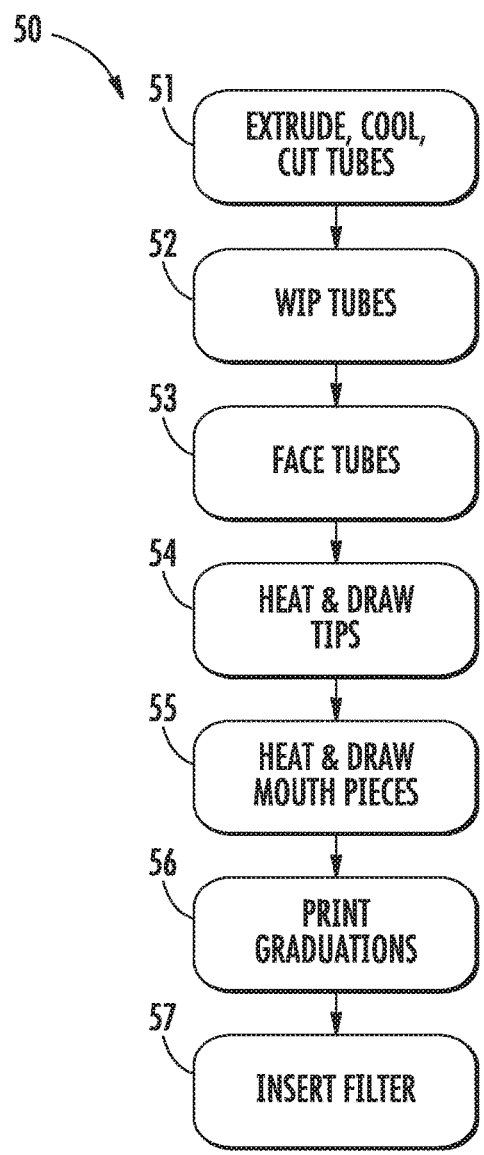
FIG. 2B is a flowchart outlining steps of a method for fabricating a drawn pipette according to FIG. 2A.
Figure 3:
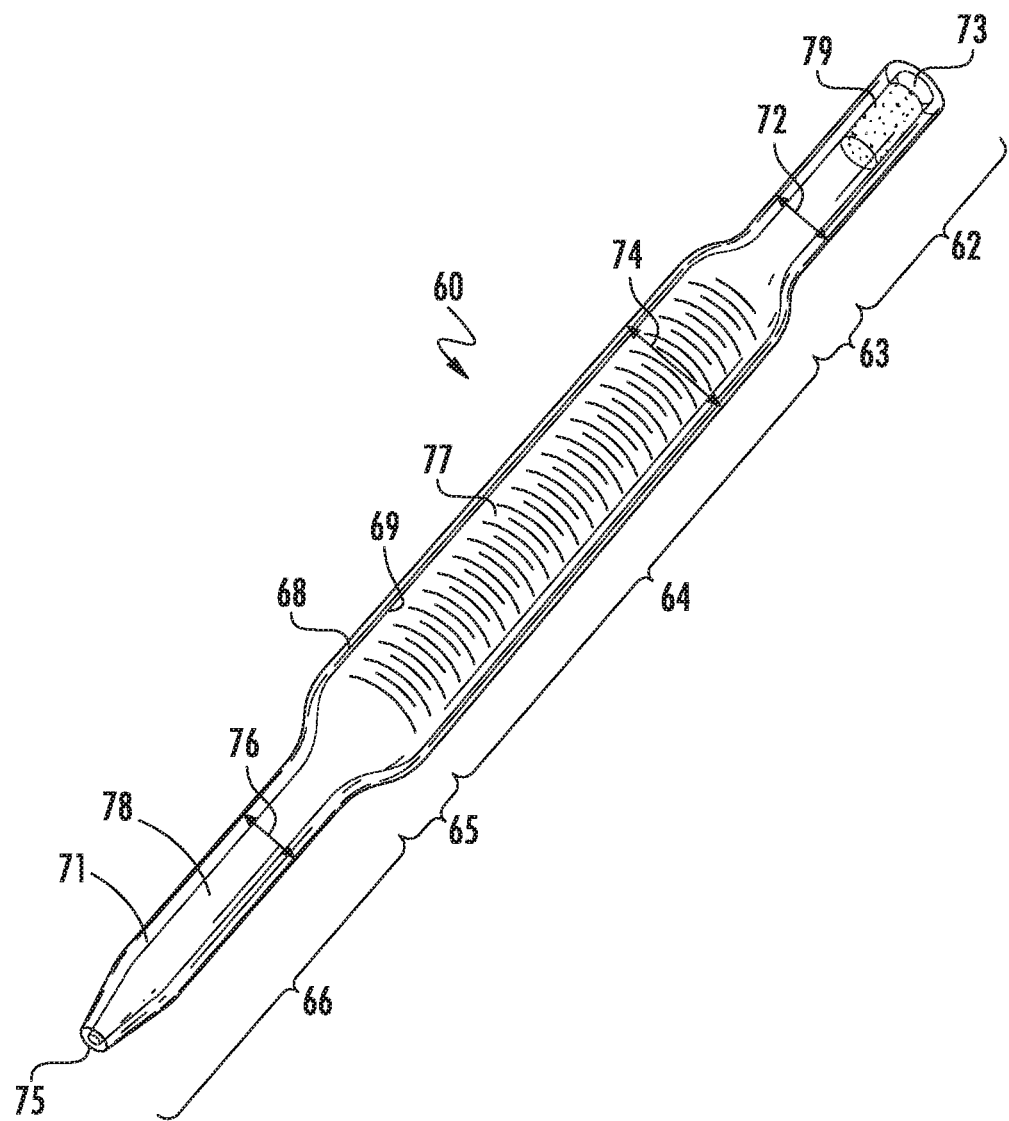
FIG. 3 is a perspective view illustration of a pipette fabricated by molding with application of a pressure differential (e.g., blow molding or vacuum forming).

The present disclosure relates to unitary measuring pipettes (e.g., serological pipettes), and methods and apparatuses for forming unitary measuring pipettes by stretch blow molding. Stretch blow molding includes a stretching of a prefabricated preform, and blowing of a stretched perform within a mold cavity. The preform may be profiled to distribute material in desired locations, resulting in precise body thickness of a pipette. By prefabricating (e.g., molding) a preform, the tip region and mouthpiece region may be formed prior to stretching, thereby enabling precise and repeatable formation of these regions in a resulting pipette, and further enabling these regions to have an increased thickness relative to a tubular body. Use of a preform with a prefabricated tip and mouthpiece regions also eliminates the need for any cutting typically required for drawn or welded pipettes.

Stretch blow molding methods may be used to produce pipettes of biaxially oriented polymer material. A brief introduction to polymer orientation principles follows, to enable understanding of biaxial orientation.

The ability of a polymer to sustain a mechanical load depends on the strength of covalent bonds and the forces between the molecules. In an amorphous system, much of a mechanical load is carried by van der Waals interactions and random coil entanglements between chains. If, however, a substantial fraction of the polymer chains can be aligned (i.e., oriented) in the load-bearing direction, then a larger portion of the load can be transmitted to the main-chain covalent bonds. In amorphous systems only chain orientation occurs, whereas both chains and crystalline regions can be aligned in semicrystalline polymers. In both amorphous and semicrystalline systems, orientation of polymer chains leads to an increased strength in the direction of orientation. Uniaxially oriented materials typically exhibit low strength in a direction perpendicular to the polymer chain orientation.

Polymer chains are oriented by subjecting them to extensional strain (flow) in a melted or near-melted state. Biaxial orientation of a polymer material can be achieved by straining the material in two directions (e.g., a radial direction and a lengthwise direction) at elevated temperature, and allowing the material to cool while strained. As compared to unoriented or uniaxially oriented polymers, biaxial orientation allows the production of reduced thickness films, containers, and objects having enhanced mechanical and optical properties.

Biaxial orientation may be obtained by stretch blow molding by expanding dimensions of, and thereby straining, a hot preform in the radial direction (e.g., by blowing) and the longitudinal axial direction (e.g., by stretching). Depending on the relative dimensions of the preform and the finished pipette, the degree of radial expansion attributable to blowing may be insufficient to impart a significant degree of radial orientation of polymer chains in a stretch blow molded pipette. To address this situation, in certain embodiments radial orientation of polymer chains may be enhanced through use of a spinning core in contact with molding material of a preform to radially shear the preform material during the preform molding process. The initial radial orientation of polymer chains in the preform, when augmented by axial orientation obtained during axial stretching, will create biaxial orientation of polymer chains in a finished pipette.

In certain embodiments, a preform and a resulting pipette (including a tubular body region, a tip region, and a mouthpiece region) may comprise thermoplastic material, which may be biaxially oriented. In certain embodiments, the thermoplastic material may comprise crystalline polystyrene, poly(styrene-butadiene-styrene), polyethylene terephthalate, polypropylene, copolymers of any two or more of the foregoing polymers, and/or recycled streams of any one or more of the foregoing polymers.

Figure 4A:
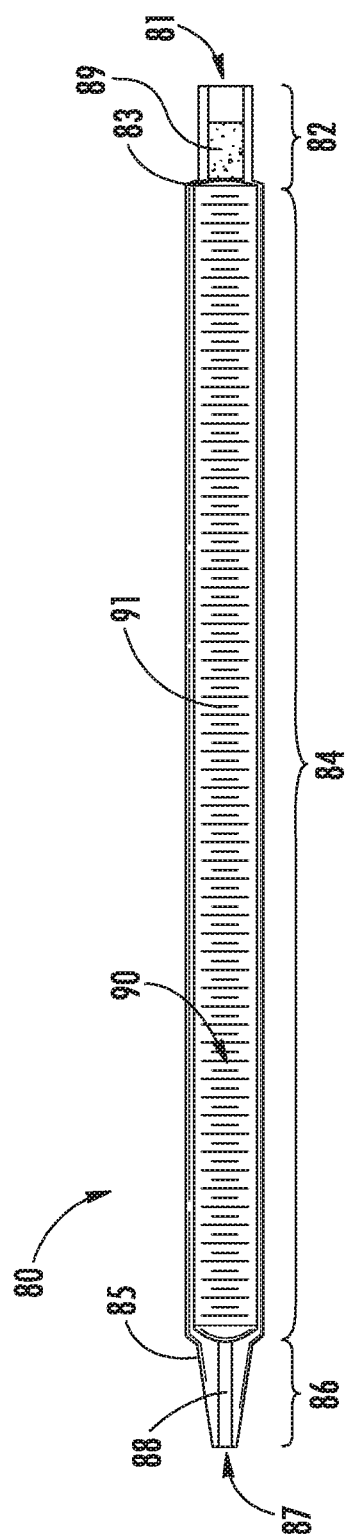
FIG. 4A is a side elevation view illustration of a pipette fabricated by stretch blow molding according to one embodiment of the present disclosure.

FIG. 4A illustrates a pipette 80 fabricated by stretch blow molding according to one embodiment of the present disclosure. The pipette 80 includes a tubular body region 84 arranged between a mouthpiece region 82 and a tip region 86, with a hollow interior 90. A first abrupt transition region 83 is provided between the mouthpiece region 82 and the tubular body region 84, and a second abrupt transition region 85 is provided between the tubular body region 84 and the tip region 86; however, such transition regions 83, 85 embody continuously uniform material without presence of any welded joints. An outer diameter of the tip region 86 is tapered in width with increasing proximity to a tip opening 87; however, the tip region 86 optionally includes a bore 88 having a substantially constant inner diameter. Such features of the tip region 86 may be fabricated during a preform molding operation. In certain embodiments, a tip region 86 may include a non-constant inner diameter. Optionally, the mouthpiece region 82 includes inner and outer diameter dimensions that are smaller than corresponding dimensions of the tubular body region 84, with the mouthpiece region 82 further including a filter 89 arranged therein between an open mouthpiece end 81 and the tubular body region 84. The tubular body region 84 further includes graduated volumetric markings 91 printed (or imprinted) along an outside surface to indicate a volume of liquid contained in the hollow interior 90. As shown, an average wall thickness of the tip region 86 is greater than a wall thickness of the tubular body region 84, and the mouthpiece region 82 has an average wall thickness that is greater than the wall thickness of the tubular body region 84. Additionally, the region of greatest wall thickness of the pipette 80 is within the tip region 86 and/or at the transition 85 between the tip region 86 and the tubular body region 84.

Figure 4B:
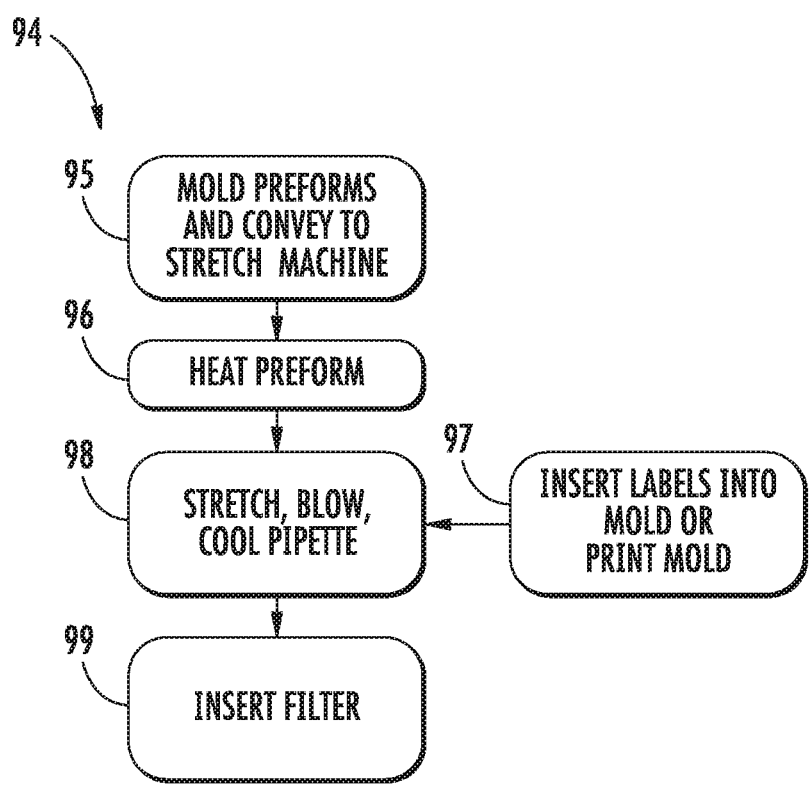
FIG. 4B is a flowchart outlining steps of a method for fabricating at least one stretch blow molded pipette according to FIG. 4A.

FIG. 4B is a flowchart outlining steps of a method 94 for fabricating stretch blow molded pipettes according to FIG. 4A. A first step 95 includes fabricating (e.g., molding) performs and conveying the preforms to a preform stretching apparatus or machine. In certain embodiments, molding of a preform may include injection molding or compression molding in a first mold defining a preform mold cavity configured to permit molding of a hollow preform therein. Optionally, the first mold may be configured to receive a core pin within the preform mold cavity, and a rotary drive unit may be employed to achieve relative rotation between the core pin and the first mold during molding of the hollow preform within the first mold. Such rotation may include rotation of the core pin while the first mold remains stationary, or may include rotation of the first mold while the core pin remains stationary. To complete molding of the preform, the preform is cooled. A second step 96 includes heating the preform to a softening temperature of the preform material in preparation for stretching and blowing of the preform. In certain embodiments, at least one infrared heating element may be used to heat the preform. A third step 97 may include depositing ink on a molding surface or inserting a label into a mold cavity to be used for blowing the preform, prior to a blowing operation, in order to impart markings onto an outer surface of a pipette during a blowing process. A fourth step 98 includes stretching the preform to form an elongated preform, blowing the elongated preform to promote radial expansion of at least a portion thereof, cooling the stretched and blown material to form a pipette, and removing the pipette from a blow molding cavity of a mold (e.g., by separating mated mold halves). A fifth step 99 includes insertion of a filter (e.g., using a filter plugging mechanism) into a mouthpiece region of a resulting pipette. Thereafter, the pipette may be conveyed to a sterilization and/or packaging station for further processing. In certain embodiments, the stretch blowing manufacturing steps may be performed in aseptic (e.g., cleanroom) environment, thereby avoiding the need for sterilization after fabrication steps are complete.

In certain embodiments, ultrasonic excitation may be applied to an injection screw and/or mold cavity during molding of the preform, to promote attainment of random orientation of polymer chains within the preform, such that need for a spinning core may be eliminated.

In certain embodiments, a stretch rod positionable within at least a portion of a hollow preform may be used to effectuate stretching of a preform and form an elongated preform. A stretch rod may be coupled with a stretch rod drive unit that is configured to move the stretch rod (e.g., by translation) within the interior of a preform. In certain embodiments, a stretch rod comprises a tapered region having a shape matching an interior taper of a transition region between a tip region and a tubular body of a pipette. In certain embodiments, a chuck or clamp may be used to immobilize a mouthpiece end of the preform during movement of the stretch rod within the interior of the preform to form the elongated preform. In certain embodiments, a preform stretching operation may be performed outside of a mold having a blow molding cavity (e.g., with a preform stretching apparatus proximate to open sections of second mold), such that after stretching of the preform, the elongated preform may be transferred to the blow molding cavity (e.g., by closing mold cavity halves around the elongated preform), and radial expansion of the elongated preform may be performed thereafter.

Figure 5A:
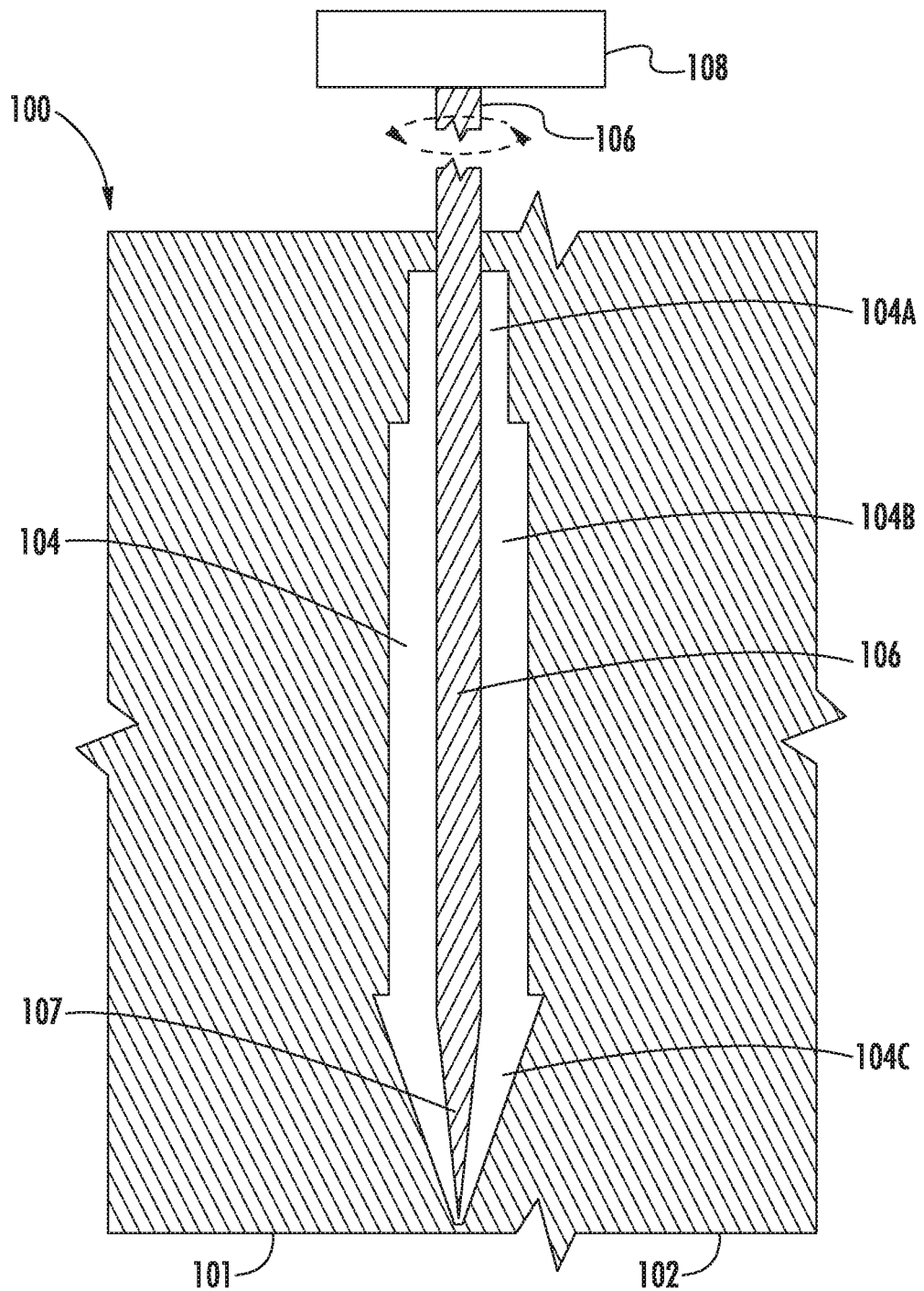
FIG. 5A is a cross-sectional view illustration of a preform mold having a rotatable core pin arranged therein, with schematic illustration of a rotary drive unit coupled to the rotatable core pin.

FIG. 5A illustrates a preform mold 100 having a rotatable core pin 106 arranged in a mold cavity 104 thereof, with a rotary drive unit 108 coupled to the rotatable core pin 106. The preform mold 100 may be formed of separable halves 101, 102 to enable removal of a preform following fabrication thereof. The mold cavity 104 includes a mouthpiece cavity portion 104A, a tubular body cavity portion 104B, and tip cavity portion 104C each having different dimensions. The rotatable core pin 106 may include a tapered end portion 107 positioned within the tip cavity portion 104C. As shown, the tubular body cavity portion 104B comprises the longest portion of the mold cavity 104, the mouthpiece cavity portion 104A and the tubular body cavity portion 104B include different but constant outer diameters (with the mouthpiece cavity portion 104A including the smallest outer diameter of the mold cavity 104), and the tip cavity portion 104C includes a variable outer diameter. In use of the preform mold 100, the separable halves 101, 102 may be closed, molten thermoplastic material may be supplied to (e.g., injected into) the mold cavity 104, and the core pin 106 may be rotated by operation of the rotary drive unit 108 while the thermoplastic material cools and solidifies in the mold cavity 104. Thereafter, the separable halves 101, 102 of the mold 100 may be separated from one another, and the preform may be removed from the core pin 106 by pulling the preform in a downward direction, and conveyed to a heating station.

Figure 5B:
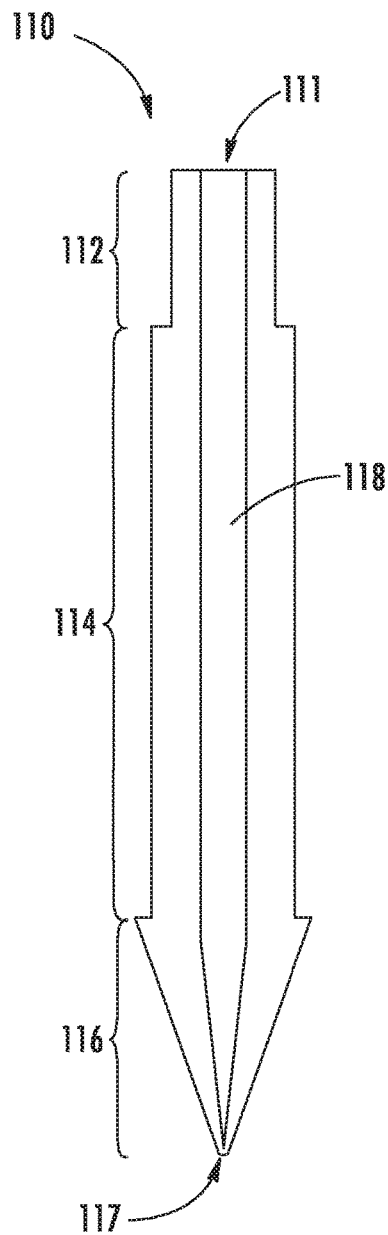
FIG. 5B is a side elevation view illustration of a preform producible with the preform mold and rotatable core pin shown in FIG. 5A.

FIG. 5B is a side elevation view illustration of a preform 110 producible with the preform mold 100 and rotatable core pin 106 shown in FIG. 5B. The preform 110 includes a tubular body precursor portion 114 arranged between a mouthpiece precursor portion 112 and a tip precursor portion 116, all surrounding a hollow interior 118 extending between a mouthpiece end 111 and a tip end 117.

Figure 5C:
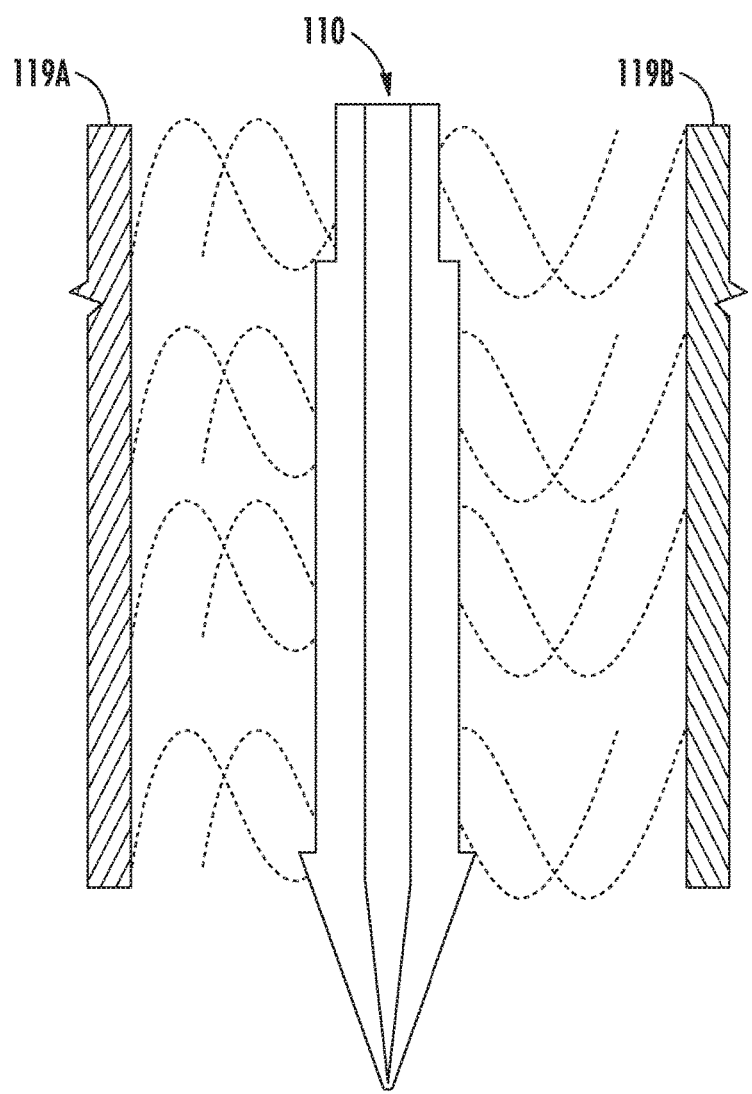
FIG. 5C is a side elevation view illustration of the preform of FIG. 5B arranged within an infrared heating apparatus and receiving infrared radiation to heat the preform.

After fabrication of the preform 110, the preform 110 may be heated to a softening temperature of the preform material, to prepare the preform 110 to be stretched and blown for formation of a pipette. In certain embodiments, such heating may be accomplished by positioning the preform 110 in or proximate to an infrared heating apparatus. FIG. 5C illustrates the preform 110 of FIG. 5B arranged within an infrared heating apparatus that includes infrared heating elements 119A, 119B, showing impingement of infrared radiation on the preform 110.

Figure 5D:
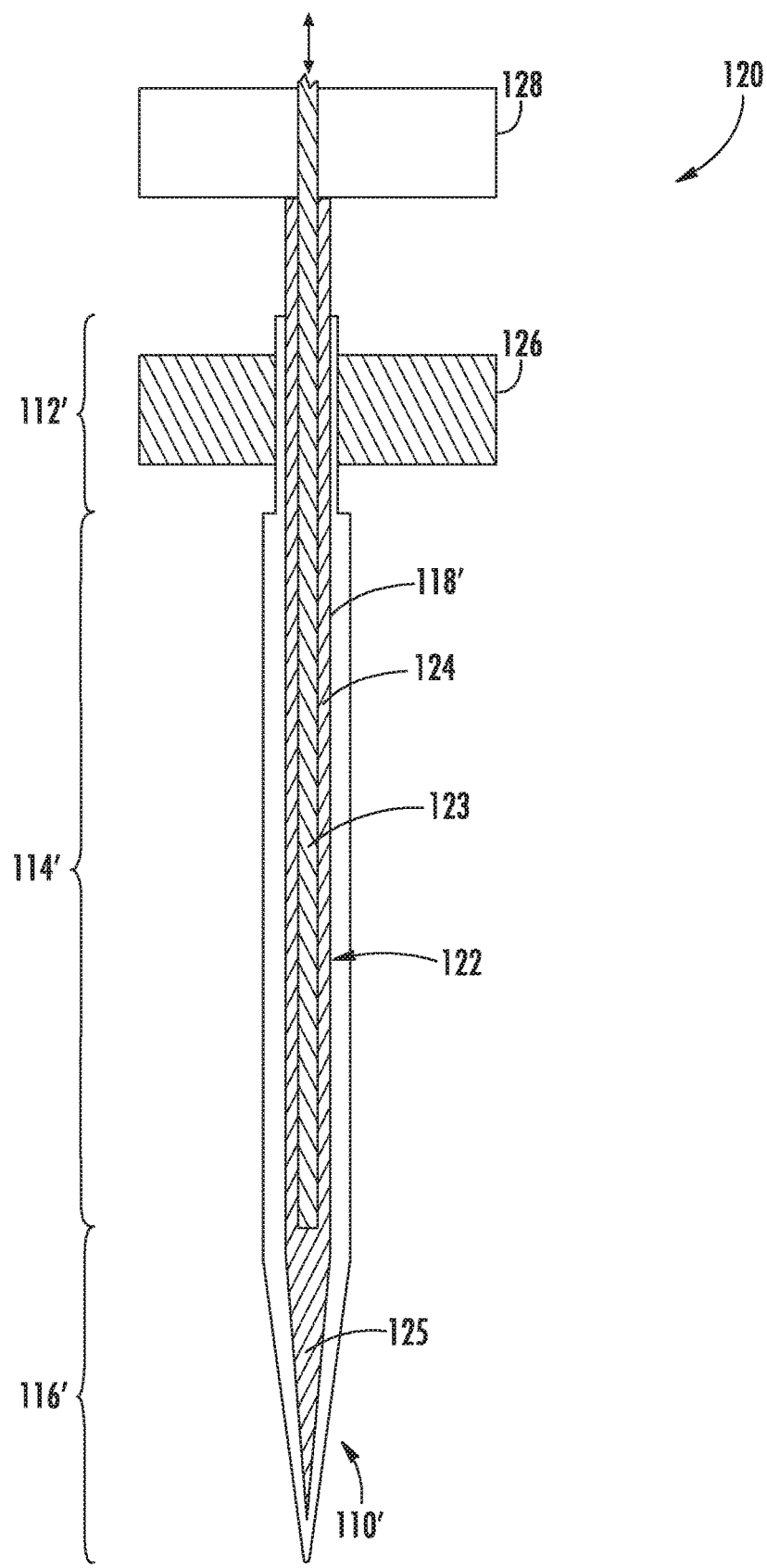
FIG. 5D is a schematic side cross-sectional view illustration of a preform stretching apparatus showing an elongated heated preform after being subjected to a stretching operation by translation of a stretch rod within an interior of the elongated heated preform, with translation of the stretch rod being motivated by a stretch rod drive unit.

FIG. 5D is a schematic side cross-sectional view illustration of a preform stretching apparatus 120 showing an elongated preform 110' (e.g., still in a heated state) after being subjected to a stretching operation by translation of a stretch rod 122 within an interior 118' of the elongated preform 110'. The stretch rod 122 optionally includes a core 123 and a cladding 124, and includes a tapered end 125. Optionally, the core 123 may be arranged to rotate along a threaded surface internal to the cladding 124 to cause translation of the stretch rod 122. In certain embodiments, the tapered end 125 has a shape corresponding to an interior taper of a tip portion 116' of the elongated preform 110' and/or corresponding to an interior taper of a transition region between the tip portion 116' and a tubular body portion 114', thereby allowing an interior of the elongated preform 110' to be plugged for blowing. The elongated preform 110' further includes a tubular body portion 114' and a mouthpiece portion 112'. Translation of the stretch rod 122 is motivated by a stretch rod drive unit 128. A chuck or clamp 126 is provided to immobilize the mouthpiece portion 112' as the stretch rod 122 is translated during the stretching operation.

Figure 5E:
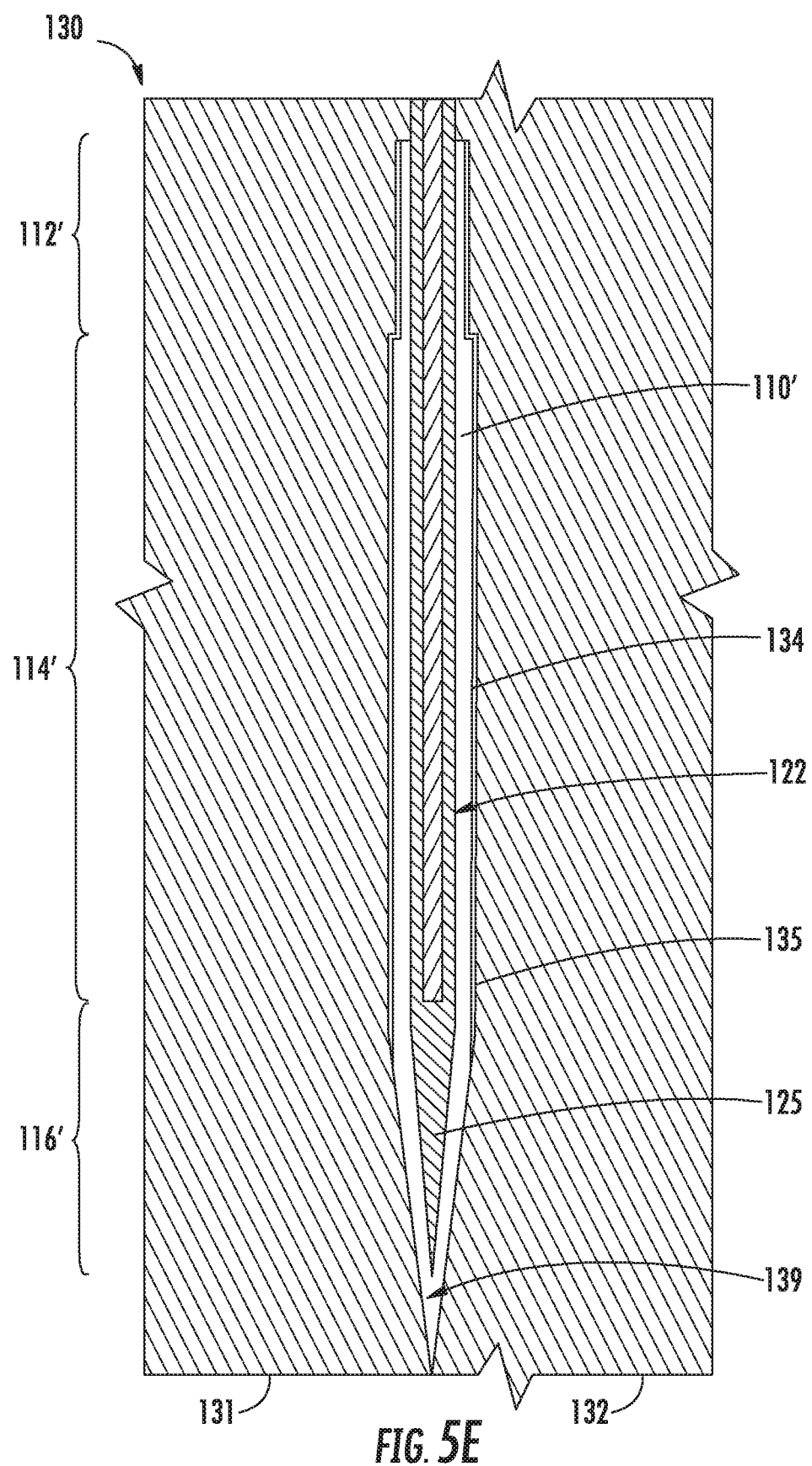
FIG. 5E is a schematic side cross-sectional view illustration of the elongated preform and stretch rod of FIG. 5D positioned within a blow molding cavity, prior to the supplying of pressurized fluid into an interior of the elongated preform to cause the elongated preform to radially expand and contact a molding surface of the mold.

FIG. 5E is a schematic side cross-sectional view illustration of the elongated, heated preform 110' (including a mouthpiece portion 112', tubular body portion 114', and tip portion 116') and stretch rod 122 of FIG. 5D positioned within a blow molding cavity 134 of a mold 130. The mold 130 is composed of separable first and second mold halves 131, 132 defining a molding surface 135. A male receiving feature 139 may be provided at a bottom of the blow molding cavity 134 to assist in closing the interior of the elongated preform 110'. As illustrated, the elongated heated preform 110' is in a state prior to blowing, involving the supplying of pressurized fluid into an interior thereof (e.g., through the stretch rod 122) to cause the elongated preform 110' to radially expand and contact a molding surface 135 of the mold 130. After the blowing operation is complete, the mold 130 may be opened by separating the mold halves 131, 132 and removal of a resulting pipette from the stretch rod 122.

Figure 5F:
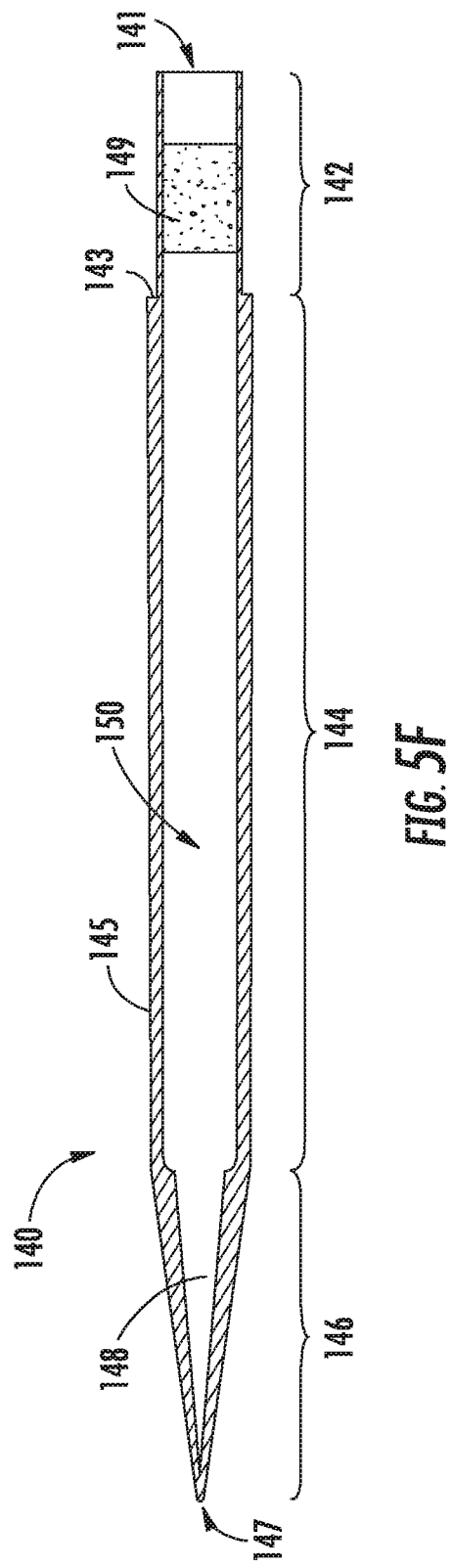
FIG. 5F is a schematic cross-sectional view illustration of a stretch blow molded pipette obtainable using the preform and apparatuses shown in FIGS. 5A-5E.

FIG. 5F is a schematic cross-sectional view illustration of a stretch blow molded pipette 140 obtainable using the preform and apparatuses shown in FIGS. 5A-5E, following stretching and blowing operations, and removal of the pipette 140 from the mold 130. The pipette 140 includes a tubular body region 144 arranged between a mouthpiece region 142 and a tip region 146, with a hollow interior 150. A first abrupt transition region 143 is provided between the mouthpiece region 142 and the tubular body region 144, and a second abrupt transition region 145 is provided between the tubular body region 144 and the tip region 146; however, such transition regions 143, 145 embody continuously uniform material without presence of any welded joints. Both an outer diameter and an internal bore 148 of the tip region 146 have a width that tapers with increasing proximity to a tip opening 147. As shown, the tip region 146 includes an average wall thickness that exceeds a wall thickness of the tubular body region 144, and the mouthpiece region 142 includes a smaller outer diameter than an outer diameter of the tubular body region 144. The mouthpiece region 142 further includes a filter 149 arranged therein between an open mouthpiece end 141 and the tubular body region 144. Although the mouthpiece region 142 is illustrated as having the same inner diameter as the tubular body region 144, in certain embodiments, the mouthpiece region 142 may have a smaller inner diameter than an inner diameter of the tubular body region 144.

FIGS. 6-9 embody tables providing calculated preform outer diameter, preform inner diameter, preform length, hoop ratio, axial ratio, and blow up ratio value ranges useful for producing stretch blow molded pipettes of multiple different volumes, with diameter and length values in inches. Hoop ratio is a ratio of the outer diameter of a tubular body region of a stretch blow molded pipette relative to the outer diameter of a tubular body region of a corresponding preform. Axial ratio is a ratio of length of a stretch blow molded pipette relative to the length of a corresponding preform. Blow up ratio is a product of hoop ratio and axial ratio.

FIG. 6 provides calculated value ranges useful for producing stretch blow molded pipettes of four different volumes having tubular body wall thickness dimensions consistent with conventional Costar® welded pipettes commercially available from Corning Incorporated (Corning, New York, USA), without using a spinning core pin during a preform fabrication step. The maximum outside diameter was calculated to enable orientation of polymer chains in a radial direction during blowing, without requiring use of a spinning core during preform molding to achieve biaxial orientation of the pipette material.

FIG. 7 provides calculated value ranges useful for producing pipettes of five different volumes, while using 50% less material than conventional Costar® welded pipettes, without using a spinning core pin during a preform fabrication step. As was the case with FIG. 6, the maximum outside diameter was calculated to enable orientation of polymer chains in a radial direction during blowing, without requiring use of a spinning core during preform molding to achieve biaxial orientation of the pipette material. When compared with FIG. 6, FIG. 7 shows that stretch blow molding a pipette requiring less material potentially opens the design range for molding of a preform, as evident by the expanded ranges for hoop ratio, axial ratio, and blow up ratio in FIG. 7.

FIG. 8 provides calculated value ranges useful for producing stretch blow molded pipettes of five different volumes having tubular body wall thickness dimensions consistent with conventional Costar® welded pipettes, including use of a spinning core pin during a preform fabrication step. When comparing FIG. 8 with FIG. 6, it is apparent that use of a spinning core enables a larger dimensional range of molded preforms, as evident by the expanded ranges for blow up ratio in FIG. 8.

FIG. 9 provides calculated value ranges useful for producing pipettes of five different volumes, while using 50% less material than conventional Costar® welded pipettes, including use of a spinning core pin during a preform fabrication step. When comparing FIG. 9 with FIGS. 7 and 8, it is apparent that use of a spinning core in combination with stretch blow molding of a pipette requiring less material enables an even larger dimensional range of molded preforms than either one of these circumstances alone, as evident by the expanded ranges for hoop ratio, axial ratio, and blow up ratio in FIG. 9 versus FIGS. 7 and 8.

According to an aspect (1) of the present disclosure, a stretch blow molded pipette is provided. The stretch blow molded pipette comprises: a tubular body arranged between a tip region and a mouthpiece region; wherein the tip region comprises an average wall thickness that is greater than a wall thickness of the tubular body, and the stretch blow molded pipette is devoid of any joint (i) between the tubular body and the tip region, and (ii) between the tubular body and the mouthpiece region.

According to an aspect (2) of the present disclosure, the stretch blow molded pipette of aspect (1) is provided, wherein the tip region comprises an aperture having a substantially constant inner diameter.

According to an aspect (3) of the present disclosure, the stretch blow molded pipette of any of aspects (1)-(2) is provided, wherein the mouthpiece region comprises an average wall thickness that is greater than the wall thickness of the tubular body.

According to an aspect (4) of the present disclosure, the stretch blow molded pipette of any of aspects (1)-(3) is provided, comprising at least one of the following features (i) or (ii): (i) the mouthpiece region comprises an inner diameter that is smaller than an inner diameter of the tubular body; or (ii) the mouthpiece region comprises an outer diameter that is smaller than an outer diameter of the tubular body.

According to an aspect (5) of the present disclosure, the stretch blow molded pipette of any of aspects (1)-(4) is provided, wherein the tubular body, the tip region, and the mouthpiece region comprise a thermoplastic material.

According to an aspect (6) of the present disclosure, the stretch blow molded pipette of any of aspects (1)-(5) is provided, wherein the tubular body comprises biaxially oriented thermoplastic material.

According to an aspect (7) of the present disclosure, the stretch blow molded pipette of any of aspects (5)-(6) is provided, wherein the tubular body, the tip region, and the mouthpiece region comprise: crystalline polystyrene, poly (styrene-butadiene-styrene), polyethylene terephthalate, polypropylene, copolymers of any two or more of the foregoing polymers, or recycled streams of any one or more of the foregoing polymers.

According to an aspect (8) of the present disclosure, the stretch blow molded pipette of any of aspects (1)-(7) is provided, wherein the tubular body comprises a wall thickness in a range of from 0.25 mm to 0.6 mm.

According to an aspect (9) of the present disclosure, the stretch blow molded pipette of any of aspects (1)-(8) is provided, wherein the tip region comprises a substantially constant inner diameter, and comprises an outer diameter that increases with proximity to the tubular body.

According to an aspect (10) of the present disclosure, the stretch blow molded pipette of any of aspects (1)-(8) is provided, wherein the tip region comprises a non-constant inner diameter.

According to an aspect (11) of the present disclosure, the stretch blow molded pipette of any of aspects (1)-(10) is provided, wherein a region of greatest wall thickness of the stretch blow molded pipette is within the tip region, at or proximate to a transition between the tip region and the tubular body.

According to an aspect (12) of the present disclosure, a method for fabricating a pipette comprising a tubular body arranged between a tip region and a mouthpiece region is provided. The method comprises: fabricating a preform comprising a hollow tubular shape; heating the preform to within a softening temperature of a material of the preform; stretching at least a portion of the heated preform to form an elongated preform; blowing at least a portion of the elongated preform within a mold cavity by applying a pressurized fluid to an interior of the heated preform to cause the heated preform to expand into contact with a molding surface and assume a pipette shape; and cooling the blown and elongated preform.

According to an aspect (13) of the present disclosure, the method of aspect (12) is provided, wherein the stretching of at least a portion of the heated preform to form an elongated preform is performed while the heated preform is outside the mold cavity.

According to an aspect (14) of the present disclosure, the method of any of aspects (12)-(13) is provided, wherein the fabricating of the preform comprises: supplying moldable material in a molten state to a cavity of a preform mold; processing the moldable material by achieving relative rotation between (i) a core pin within the cavity of the preform and in contact with the moldable material and (ii) the perform mold; and cooling the moldable material to a solid state.

According to an aspect (15) of the present disclosure, the method of any of aspects (12)-(14) is provided, further comprising immobilizing a mouthpiece end of the preform prior to the stretching of at least a portion of the heated preform.

According to an aspect (16) of the present disclosure, the method of any of aspects (12)-(15) is provided, wherein the stretching of at least a portion of the heated preform utilizes a stretch rod comprising a tapered region having a shape matching an interior taper of a transition region between the tip region and the tubular body of the pipette.

According to an aspect (17) of the present disclosure, the method of any of aspects (12)-(16) is provided, further comprising one of the following steps (a) or (b) prior to the blowing of at least a portion of the elongated preform: (i) depositing ink on the molding surface, or (ii) inserting a label into the mold cavity.

According to an aspect (18) of the present disclosure, the method of any of aspects (12)-(17) is provided, wherein the heating of the preform to within a softening temperature of a material of the preform comprises impinging infrared radiation on the preform.

According to an aspect (19) of the present disclosure, a system for fabricating a pipette comprising a tubular body arranged between a tip region and a mouthpiece region by a stretch blow molding process is provided. The system comprises: a first mold defining a preform mold cavity configured to permit molding of a hollow preform therein; a preform stretching apparatus comprising a stretch rod positionable within an interior of the hollow preform and coupled with a stretch rod drive unit that is configured to move the stretch rod within the interior of the hollow preform to form an elongated preform; a second mold defining a blow molding cavity configured to contain at least a portion of the elongated preform while pressurized fluid is supplied to an interior of the elongated preform to cause the elongated preform to radially expand and contact a molding surface of the second mold.

According to an aspect (20) of the present disclosure, the system of aspect (19) is provided, wherein the first mold is configured to receive a core pin within the preform mold cavity, and the system further comprises a rotary drive unit configured to achieve relative rotation between the core pin and the first mold during molding of the hollow preform within the first mold.

According to an aspect (21) of the present disclosure, the system of any of aspects (19)-(20) is provided, being configured to enable movement of the stretch rod within the interior of the preform to form the elongated preform while the preform is outside the blow molding cavity.

According to an aspect (22) of the present disclosure, the system of any of aspects (19)-(21) is provided, further comprising an infrared heating element configured to heat the preform to a softening temperature of a material of the preform prior to movement of the stretch rod within the interior of the hollow preform to form the elongated preform.

According to an aspect (23) of the present disclosure, the system of any of aspects (19)-(22) is provided, further comprising a chuck or clamp configured to immobilize a mouthpiece end of the preform during movement of the stretch rod within the interior of the hollow preform to form the elongated preform.

According to an aspect (24) of the present disclosure, the system of any of aspects (19)-(23) is provided, wherein the stretch rod comprises a tapered region having a shape matching at least one of (i) an interior taper of the tip region, or (ii) an interior taper of a transition region between the tip region and the tubular body of the pipette.

In further aspects of the disclosure, it is specifically contemplated that any two or more aspects, embodiments, or features disclosed herein may be combined for additional advantage.

As used herein, the singular forms "a," "an," and "the" include plural referents unless the context clearly dictates otherwise. Thus, for example, reference to a "notch" includes examples having two or more such "notches" unless the context clearly indicates otherwise The term "include" or "includes" means encompassing but not limited to, that is, inclusive and not exclusive.

"Optional" or "optionally" means that the subsequently described event, circumstance, or component, can or cannot occur, and that the description includes instances where the event, circumstance, or component, occurs and instances where it does not.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of" are implied.

It will be apparent to those skilled in the art that various modifications and variations can be made to the present inventive technology without departing from the spirit and scope of the disclosure. Since modifications, combinations, sub-combinations and variations of the disclosed embodiments incorporating the spirit and substance of the inventive technology may occur to persons skilled in the art, the inventive technology should be construed to include everything within the scope of the appended claims and their equivalents.

What is claimed is:

1. A stretch blow molded pipette comprising:
a tubular body arranged between a tip region and a mouthpiece region;
wherein the tubular body comprises biaxially oriented thermoplastic material, and the tip region comprises an average wall thickness that is greater than a wall thickness of the tubular body, and the stretch blow molded pipette is devoid of any joint (i) between the tubular body and the tip region, and (ii) between the tubular body and the mouthpiece region.

2. The stretch blow molded pipette of claim 1, wherein the tip region comprises an aperture having a constant inner diameter.

3. The stretch blow molded pipette of claim 1, wherein the mouthpiece region comprises an average wall thickness that is greater than the wall thickness of the tubular body.

4. The stretch blow molded pipette of claim 1, comprising at least one of the following features (i) or (ii): (i) the mouthpiece region comprises an inner diameter that is smaller than an inner diameter of the tubular body; or (ii) the mouthpiece region comprises an outer diameter that is smaller than an outer diameter of the tubular body.

5. The stretch blow molded pipette of claim 1, wherein the tubular body, the tip region, and the mouthpiece region comprise a thermoplastic material.

6. The stretch blow molded pipette of claim 5, wherein the tubular body, the tip region, and the mouthpiece region comprise: crystalline polystyrene, poly(styrene- butadiene-styrene), polyethylene terephthalate, polypropylene, copolymers of any two or more of the foregoing polymers, or recycled streams of any one or more of the foregoing polymers.

7. The stretch blow molded pipette of claim 1, wherein the tubular body comprises a wall thickness in a range of from 0.25 mm to 0.6 mm.

8. The stretch blow molded pipette of claim 1, wherein the tip region comprises a constant inner diameter, and comprises an outer diameter that increases with proximity to the tubular body.

9. The stretch blow molded pipette of claim 1, wherein the tip region comprises a non-constant inner diameter.

10. The stretch blow molded pipette of claim 1, wherein a region of greatest wall thickness of the stretch blow molded pipette is within the tip region, at or proximate to a transition between the tip region and the tubular body.

11. A method for fabricating a pipette comprising a tubular body arranged between a tip region and a mouthpiece region, the method comprising:
fabricating a preform comprising a hollow tubular shape;
heating the preform to within a softening temperature of a material of the preform to form a heated preform;
stretching at least a portion of the heated preform to form an elongated preform;
blowing at least a portion of the elongated preform within a mold cavity by applying a pressurized fluid to an interior of the elongated preform to cause the elongated preform to expand into contact with a molding surface and assume a pipette shape and form a blown preform comprising a biaxially oriented thermoplastic material; and
cooling the blown preform.

12. The method of claim 11, wherein the stretching of at least a portion of the heated preform to form an elongated preform is performed while the heated preform is outside the mold cavity.

13. The method of claim 11, wherein the fabricating of the preform comprises:
supplying moldable material in a molten state to a cavity of a preform mold;
processing the moldable material by achieving relative rotation between (i) a core pin within the cavity of the preform and in contact with the moldable material and (ii) the perform mold; and
cooling the moldable material to a solid state.

14. The method of claim 11, further comprising immobilizing a mouthpiece end of the preform prior to the stretching of at least a portion of the heated preform.

15. The method of claim 11, wherein the stretching of at least a portion of the heated preform utilizes a stretch rod comprising a tapered region having a shape matching an interior taper of a transition region between the tip region and the tubular body of the pipette.

16. The stretch blow molded pipette of claim 1, wherein the tip region comprises an aperture having a non-constant inner diameter.

17. The stretch blow molded pipette of claim 1, wherein the tip region comprises a non-constant inner diameter, and comprises an outer diameter that increases with proximity to the tubular body.

* * * * *